(12) United States Patent
Iyer (10) Patent No.: US 11,003,915 B2
(45) Date of Patent: May 11, 2021

(54) METHOD AND SYSTEM FOR SUMMARIZING MULTIMEDIA CONTENT

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 87 days.

(21) Appl. No.: 16/370,241

(22) Filed: Mar. 29, 2019

(65) Prior Publication Data

US 2020/0311434 A1 Oct. 1, 2020

(30) Foreign Application Priority Data

Mar. 29, 2019 (IN) .............................. 201941012549

(51) Int. Cl.
 *G06K 9/00* (2006.01)
(52) U.S. Cl.
 CPC ..... *G06K 9/00751* (2013.01); *G06K 9/00718* (2013.01); *G06K 2009/00738* (2013.01)
(58) Field of Classification Search
 None
 See application file for complete search history.

(56) References Cited

U.S. PATENT DOCUMENTS

| | | | |
|---|---|---|---|
| 2010/0104261 | A1 | 4/2010 | Liu et al. |
| 2012/0123780 | A1 | 5/2012 | Gao et al. |
| 2016/0027470 | A1 | 1/2016 | Newman et al. |
| 2018/0268223 | A1* | 9/2018 | Janakiraman ...... G06K 9/00771 |
| 2019/0251364 | A1* | 8/2019 | Park ..................... G06F 16/739 |
| 2020/0125600 | A1* | 4/2020 | Jo ...................... G06K 9/00369 |

FOREIGN PATENT DOCUMENTS

KR 20140040474 A 4/2014

\* cited by examiner

*Primary Examiner* — Leon Viet Q Nguyen
(74) *Attorney, Agent, or Firm* — Finnegan, Henderson, Farabow, Garrett & Dunner, LLP (57) ABSTRACT

This disclosure relates to a method and system for summarizing multimedia content. The method may include receiving multimedia content. The method may further include identifying one or more primary objects, wherein identifying the primary objects comprises identifying one or more actions associated with the primary objects and one or more interactions between the primary objects and one or more secondary objects. The primary objects are associated with one or more parameters. The method may further include determining at least one primary object of interest from the primary objects by selectively prioritizing the parameters. The method may further include summarizing the multimedia content based on the primary object of interest, actions associated with the primary object of interest, interactions between the primary object of interest and the secondary objects, and interactions between the secondary objects and one or more tertiary objects.

13 Claims, 4 Drawing Sheets

FIG. 1: System Environment 100

FIG. 2: Multimedia Content Summarization Device 102

FIG. 3: Method 300 for summarizing multimedia content

FIG. 4: Example Computer System

METHOD AND SYSTEM FOR SUMMARIZING MULTIMEDIA CONTENT

TECHNICAL FIELD

This disclosure relates generally to the field of multimedia content, and more particularly to a method and a system for summarizing multimedia content.

BACKGROUND

With the evolution of digital camera and its use in capturing videos, a large chunk of content may be present in a video. As multimedia content is very diverse, user is often interested in a gist or a summary of the multimedia content that is adequate to provide the intended information. Moreover, the user will not have enough time to look into details of every document in an area of their interest.

Video summarization helps in efficient storage, quick browsing, and retrieval of large collection of video data without losing important aspects. The video summarization is also effective in reducing size of the documents. The video summarization is especially useful when the user is interested in only those scenes with a particular character or object present in it.

Presently, there are several technologies that summarizes videos for user consumption. However, these technologies have a disadvantage of providing equal weightage to all objects present in the multimedia content. For instance, there might be a situation where an object (or a person) remains quiet and inactive in a frame, yet was found to be a significant character in the multimedia content. The presence of the object (or the person) may be required in a summary to maintain the continuity of the summary. In the present technology of video summarization, there is no way of maintaining the continuity by including such objects or persons in the summary.

It is therefore desirable to provide a mechanism for summarizing and rendering multimedia content. It may be further desired to summarize the multimedia content based on user interest or object of interest.

SUMMARY

In one embodiment, a method of summarizing multimedia content is disclosed. In one example, the method comprises receiving multimedia content. The method further comprises identifying one or more primary objects from the multimedia content. The one or more primary objects are associated with one or more parameters. The identification of the one or more primary objects comprises one or more actions associated with the one or more primary objects and one or more interactions between the one or more primary objects and one or more secondary objects. The method further comprises determining at least one primary object of interest from the one or more primary objects by selectively prioritizing the one or more parameters. The method further comprises summarizing the multimedia content based on the at least one primary object of interest, one or more actions associated with the at least one primary object of interest, one or more interactions between the at least one primary object of interest and the one or more secondary objects, and one or more interactions between the one or more secondary objects and one or more tertiary objects.

In another embodiment, a system is disclosed for summarizing multimedia content. The system comprises a processor and a memory communicatively coupled to the processor. The memory stores processor-executable instructions, which, on execution, cause the processor to receive multimedia content. The processor-executable instructions, on execution, further cause the processor to identify one or more primary objects from the multimedia content. The one or more primary objects are associated with one or more parameters. The identification of the one or more primary objects comprises one or more actions associated with the one or more primary objects and one or more interactions between the one or more primary objects and one or more secondary objects. The processor-executable instructions, on execution, further cause the processor to determine the one or more primary objects by selectively prioritizing the one or more parameters. The processor-executable instructions, on execution, further cause the processor to summarize the multimedia content, based on the at least one primary object of interest, one or more actions associated with the at least one primary object of interest, one or more interactions between the at least one primary object of interest and the one or more secondary objects, and one or more interactions between the one or more secondary objects and one or more tertiary objects.

In yet another embodiment, a non-transitory computer-readable medium storing computer-executable instructions for summarizing multimedia content is disclosed. In one example, the stored instructions, when executed by a processor, cause the processor to receive multimedia content. The processor-executable instructions, on execution, further cause the processor to identify one or more primary objects from the multimedia content. The one or more primary objects are associated with one or more parameters. The identification of the one or more primary objects comprises one or more actions associated with the one or more primary objects and one or more interactions between the one or more primary objects and one or more secondary objects. The operations further comprise determining at least one primary object of interest from the one or more primary objects by selectively prioritizing the one or more parameters. The operations further comprise summarizing the multimedia content based on the at least one primary object of interest, one or more actions associated with the at least one primary object of interest, one or more interactions between the at least one primary object of interest and the one or more secondary objects, and one or more interactions between the one or more secondary objects and one or more tertiary objects.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description may be considered as exemplary only, with the true scope and spirit being indicated by the following claims.

Figure 1:
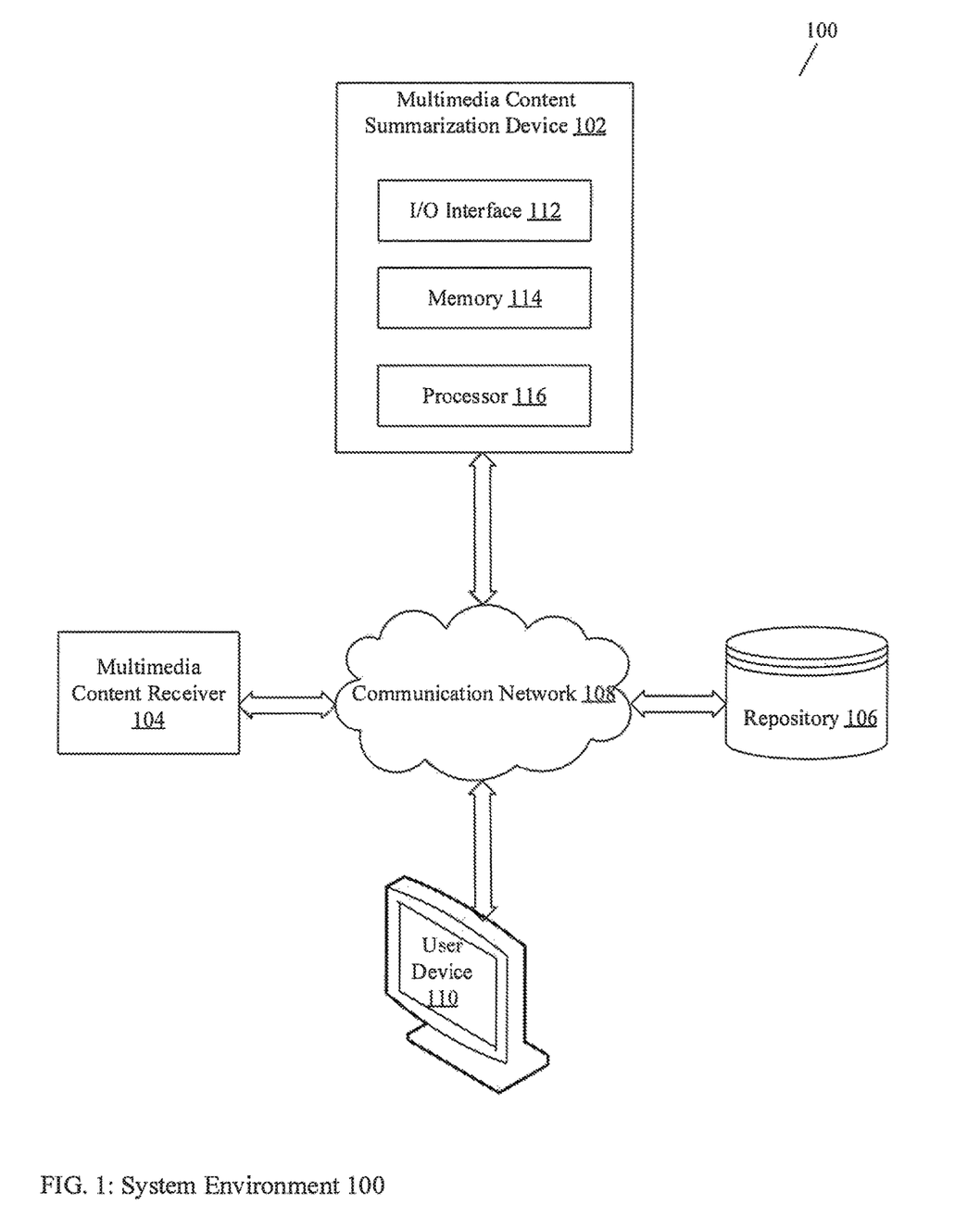
FIG. 1 is a block diagram of an exemplary network environment for summarizing multimedia content, in accordance with some embodiments of the present disclosure.

Referring now to FIG. 1, an exemplary network environment 100 for summarizing multimedia content is illustrated, in accordance with some embodiments of the present disclosure. As will be described in greater detail in conjunction with FIG. 2, the multimedia content summarization device 102 summarizes multimedia content based on an object of interest or a user interest. The multimedia content summarization device 102 may receive multimedia content. The multimedia content may comprise a video, an audio, a text or an image. The multimedia content summarization device 102 may further identify one or more primary objects from the multimedia content to be used for summarizing the multimedia content. Identifying the primary objects may comprise identifying one or more actions associated with the primary objects and one or more interactions between the primary objects and one or more secondary objects. The primary objects are associated with one or more parameters. The multimedia content summarization device 102 further determines, at least one primary object of interest from the primary objects. The multimedia content summarization device 102 then summarizes the multimedia content based on the primary object of interest, actions associated with the primary object of interest, interactions between the primary object of interest and the secondary objects, and interactions between the secondary objects and one or more tertiary objects.

As shown in FIG. 1, the network environment 100 includes a multimedia content summarization device 102 associated with a multimedia content receiver 104, a user device 110 and one or more remote network entities, such as the repository 106. The multimedia content summarization device 102 and the repository 106 may be communicatively coupled with each other via a communication network 108. In an embodiment the multimedia content receiver 104 includes live, online or a prerecorded multimedia content. A person skilled in the art may be able to appreciate that any other multimedia content receiver 104, not mentioned explicitly, may also be included in the present disclosure. In an embodiment, the multimedia content may include a video, associated audio and text. In an embodiment, the multimedia content may comprise Mp4, AVI 3GP, Divx, png and Gif file.

The multimedia content summarization device 102 may include suitable logic, circuitry, interfaces, and/or code for summarizing the multimedia content. The multimedia content summarization device 102 may include an I/O interface 112, a computer-readable medium e.g. (a memory) 114 and a processor 116. The I/O interface 112 may be configured to receive user inputs through a plurality of interactive models such as video, text, voice, human Intelligence, or the like. The I/O interface 112 may also receive the multimedia content from the multimedia content receiver 104 via a communication network 108.

The computer-readable storage medium (for example, memory 114) may be communicatively coupled to the processor 116 of the multimedia content summarization device 102. The memory 114 may store instructions that, when executed by the processor 116, cause the processor 116 to perform data reception and transmission in accordance with aspects of the present disclosure. In an embodiment, the memory 114 may store processor instructions which may cause the processor 116 to execute the instructions for summarizing the multimedia content based on a user interest or an object of interest. The memory 114 may also store various data (e.g., multimedia content received, one or more objects, one or more parameters etc.) that may be captured, processed, and/or required by the network environment 100.

The communication network 108 may include a medium through which the multimedia content summarization device 102 and the repository 106 present in the network environment 100 may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The repository 106 may include suitable logic, circuitry, interfaces, and/or code for storing data and modules. The repository 106, may include at least one of the primary objects, the secondary objects, the actions associated with the primary objects, the interactions between the primary objects and the secondary objects, or the one or more parameters. Moreover, repository 106 may also get auto updated periodically and/or based on the user input and the summarized multimedia content.

The multimedia content summarization device 102 may be connected to the user device 110 through the communication network 108. In an embodiment, the user device 110 may include, but is not limited to, a web-enabled television, a laptop, a desktop computer, a Personal Digital Assistant (PDA), a notebook, a smartphone, a tablet, a server, and any other computing devices. A person skilled in the art would understand that, any other user devices, not mentioned explicitly, may also be used in the present disclosure.

The multimedia content summarization device 102 may summarize multimedia content based on the primary object of interest, the actions associated with the primary object of interest, the interactions between the primary object of interest and the secondary objects, and the interactions between the secondary objects and the tertiary objects. The multimedia content summarization device 102 may further comprise creating the repository 106, wherein the repository 106 may include the primary objects, the secondary objects, the actions associated with the primary objects, the interactions between the primary objects and the secondary objects, and the parameters.

The multimedia content summarization device 102 may receive the multimedia content from the multimedia content receiver 104 via the communication network 108. The multimedia content may include video, audio, text or image. In an embodiment, a generic video may include associated audio and subtitle text. In another embodiment, a video may include only associated audio. Multimedia content may be a live, online or a prerecorded file. In an embodiment, the multimedia content may comprise Mp4, AVI 3GP, Divx, png and Gif.

The multimedia content summarization device 102 may further perform identification of primary objects from the multimedia content stored in the repository 106. Identifying the primary objects from the multimedia content may comprise parsing a plurality of frames associated with the multimedia content. The parsing of a plurality of frames may include simultaneous parsing of associated audio and text (for example subtitles) of the multimedia content. For example, in a wedding video the primary objects may be a bride, a groom, or a family member of the bride and groom etc. In another example, a wildlife photographer has shot video of the entire forest, the primary object may be each of the animals that had appeared in the video. The primary objects may be associated with the parameters. The parameters associated with the primary objects may comprise frequency of appearance of the primary objects, duration of appearance of the primary objects, the number of interactions between the primary objects and the secondary objects, and frequency of reference of the primary objects in the multimedia content. For example, in the wedding video, the parameters associated with the primary objects (the bride, the groom, the relatives) may be the number of times the bride and groom appeared in the entire wedding video, the total time of their presence in the video, the number of people they may have interacted with in the video etc. Further, identifying the primary objects may comprise identifying the actions associated with the primary objects and the interactions between the primary objects and the secondary objects. The identified primary object, secondary object, the parameters associated with the primary object, the actions associated with the primary objects and the interactions between the primary objects and the secondary objects are all stored in the repository 106.

Upon identification of the primary objects from the multimedia content, the multimedia content summarization device 102 may determine the primary object of interest from the primary objects by selectively prioritizing the parameters stored in the repository 106. In an embodiment, the primary object of interest may be identified by the user input. The user input may be in any form comprising a text, an audio, a video, an image etc. For example, a wildlife photographer has shot video of the entire forest, the primary objects may be all the animals shot in the video but he is interested only in frames having a lion. The wildlife photographer may provide a user input as "lions", which may be the primary object of interest. In an embodiment, the primary object of interest is identified based on the parameters using a long short type memory (LSTM) network.

The multimedia content summarization device 102 may assign a weight to each of the parameters stored in the repository 106. The multimedia content summarization device 102 may further determine the primary object of interest from the primary objects based on the assigned weight. A weight may be assigned based on adding a value allocated to the parameters associated with the primary objects and identifying the actions associated with the primary objects and the interactions between the primary objects and the secondary objects. Wherein the parameters may comprise frequency of appearance of the primary objects, duration of appearance of the primary objects, the number of interactions between the primary objects and the secondary objects, and frequency of reference of the primary objects in the multimedia content. In an embodiment, the actions associated with the primary objects may be assigned higher weightage than the duration of appearance of the primary objects. In another embodiment, the actions may be assigned high weightage especially if the duration of the action is small. For example, the duration of appearance of a dog in a video may be for three minutes. But if the dog is just sleeping for the entire duration of appearance, it may be assigned less weightage. In another example, the duration of appearance of the primary object may be one minute and the actions associated with the primary objects may span for 20 seconds. The actions associated may change in that time span for 3 times. Hence, more weightage may be allotted to such changing action. In an embodiment, the ratio of the action associated with the primary object in the total duration of the appearance of object may be multiplied with number of times the action changes.

The multimedia content summarization device 102 may further summarize the multimedia content based on the primary object of interest, actions associated with the primary object of interest, interactions between the primary object of interest and the secondary objects, and interactions between the secondary objects and the tertiary objects. Summarizing the multimedia content may comprise retaining a predefined portion of the multimedia content appearing before and after the multimedia content associated with the primary object of interest. The summarized multimedia may include the scenes having the primary object of interest, the interactions between the primary object of interest and the secondary objects, and the interactions between the secondary objects and the tertiary objects. In an embodiment, to maintain the continuity of the primary object of interest, the summarized multimedia content may have a predefined portion of the multimedia content appearing before and after the multimedia content.

In an embodiment, the parts of the multimedia content that includes the primary object of interest may be assigned high weight. The remaining parts of the multimedia content may be assigned less weight. However, to maintain the continuity of the context for summarizing, a predefined portion of the multimedia content appearing before and after the multimedia content associated with the primary object of interest is retained, although the portion may not contain the primary object of interest. The predefined portion of the multimedia content on either side of frame containing the primary object of interest may be retained to ensure continuity of context flow and to ensure that the audio or text associated with the video may not stop mid-way with half sentence. In one embodiment, if the secondary object appears in a frame and in another frame interacts with the primary object of interest, the frame may be retained to maintain the continuity of the summarized multimedia content.

In an embodiment, the plurality of frames devoid of the primary object of interest or reference of the primary objects may be discarded. The frames are summarized based on the weight. In an embodiment, the plurality of frames with lower weight may be summarized more briefly.

It should be noted that the various modules described above may be implemented in programmable hardware devices such as programmable gate arrays, programmable array logic, programmable logic devices, and so forth. Alternatively, the various modules described above may be implemented in software for execution by various types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over the communication network 108. For example, the exemplary network environment 100 may transmit data over the communication network 108 by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the processors on the network environment 100 to perform some or all of the techniques described herein. Similarly, application specific integrated circuits (ASICs) configured to perform some or all of the processes described herein may be included in the one or more processors on the network environment 100.

Figure 2:
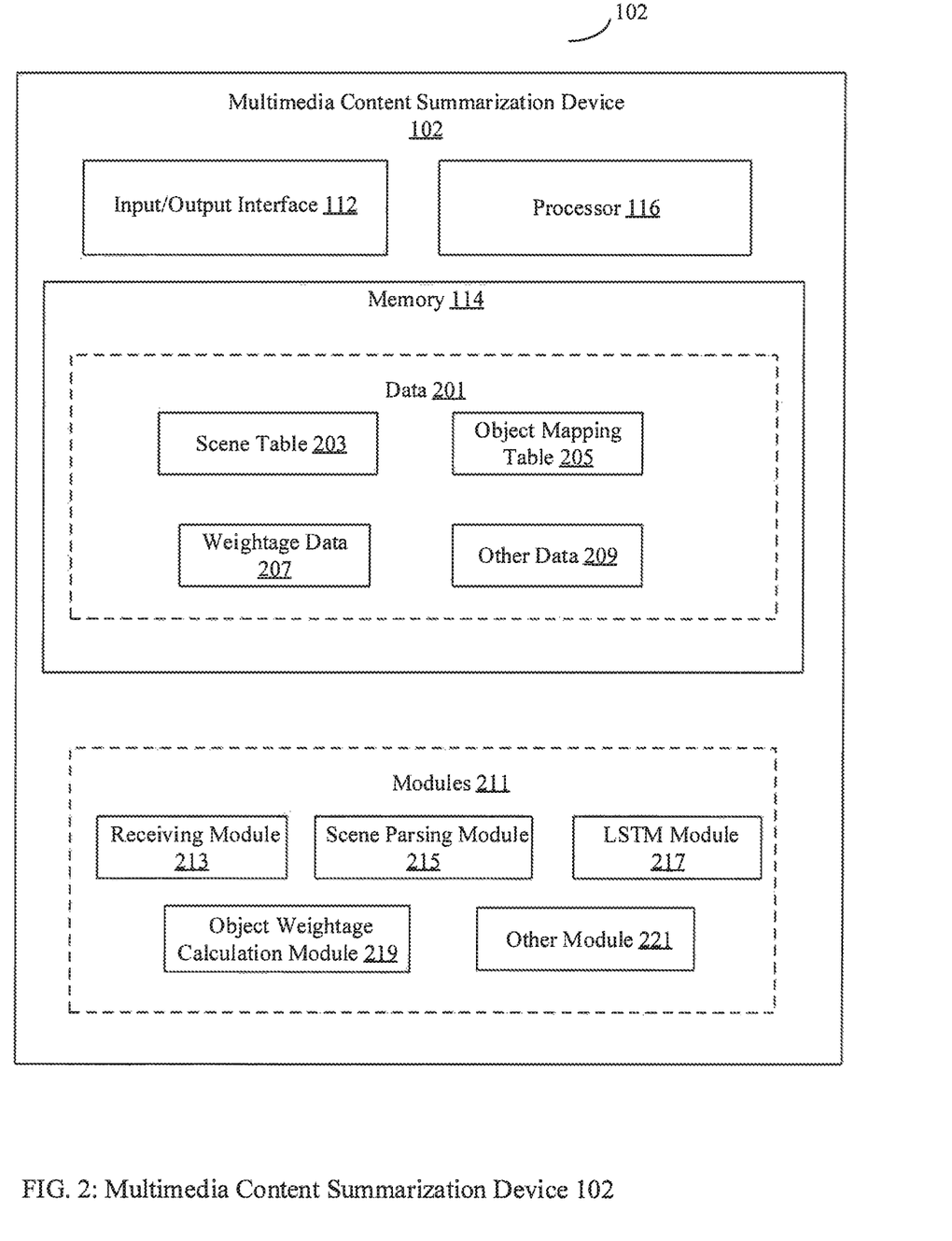
FIG. 2 is a block diagram of a Multimedia content summarization device for summarizing multimedia content, in accordance with some embodiments of the present disclosure.

FIG. 2 is a block diagram of a multimedia content summarization device 102 for summarizing multimedia content, in accordance with some embodiments of the present disclosure. FIG. 2 is explained in conjunction with elements from FIG. 1. With reference to FIG. 2, there is shown the multimedia content summarization device 102. The multimedia content summarization device 102 may include one or more processors, such as a processor 116. The multimedia content summarization device 102 may further include a memory 114 and an input/output (I/O) interface 112. The processor 116 may be communicatively coupled to the memory 114 and the I/O interface 112. In an embodiment, the multimedia content summarization device 102 may be communicatively coupled to the one or more remote network entities, such as the repository 106 through the communication network 108.

In some implementations, the multimedia content summarization device 102 may include data 201 and modules 211. As an example, the data 201 may be stored in a memory 114 configured in the multimedia content summarization device 102. In one embodiment, the data 201 may include a scene table 203, an object mapping table 205, weightage data 207 and other data 209. In the illustrated FIG. 2, modules are described herein in detail.

In some embodiments, the data 201 may be stored in the memory 114 in form of various data structures. Additionally, the data 201 can be organized using data models, such as relational or hierarchical data models. The other data 209 may store data, including temporary data and temporary files, generated by the modules 211 for performing the various functions of the multimedia content summarization module 102. In some embodiments, the data 201 stored in the memory 114 may be processed by the modules 211 of the multimedia content summarization module 102. The modules 211 may be stored within the memory 114. In an example, the modules 211 communicatively coupled to the processor 116 may also be present outside the memory 114 as shown in FIG. 2 and implemented as hardware. As used herein, the term modules 211 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 211 may include, for example, a receiving module 213, a scene parsing module 215, an LSTM module 217, an object weightage calculation module 219 and other modules 221. The other modules 221 may be used to perform various miscellaneous functionalities of the multimedia content summarization device 102. It will be appreciated that such aforementioned modules 211 may be represented as a single module or a combination of different modules.

The receiving module 213 may receive the multimedia content from the multimedia content receiver 104. In an embodiment, the multimedia content receiver 104 may be placed in the user device 110. In another embodiment, the multimedia content receiver 104 may be placed in the multimedia content summarization device 102. In an embodiment, the multimedia content may include a video, associated audio and text (subtitles).

The scene parsing module 215 may parse the multimedia content into one or more primary objects, one or more actions associated with the primary objects and one or more interactions between the primary objects and one or more secondary objects. The primary objects are associated with one or more parameters. The parameters may include frequency of appearance of the primary objects, duration of appearance of the primary objects, the number of interactions between the primary objects and the secondary objects, and frequency of reference of the primary objects in the multimedia content. The output of the scene parsing module is stored in the scene table 203. The scene table 203 corresponds to the primary objects, the secondary objects, the actions associated with the primary objects, the interactions between the primary objects and the secondary objects, and the start and end time of the interaction. In one embodiment, the scene table 203 may be added to the repository 106. Table. 1 shows an exemplary scene table 203.

TABLE 1

|   | 1° Obj | 2° Obj | Interaction | Start Time | End Time |
|---|--------|--------|-------------|------------|----------|
| 1 | Archie | Jughead | Joking | 16:00:00 | 16:05:00 |
| 2 | Archie | Moose | Playing | 15:00:00 | 15:30:00 |
| 3 | Archie | Veronica | Dancing | 20:30:00 | 20:45:00 |
| 4 | Archie | Betty | Hugging | 18:00:00 | 18:05:00 |

The LSTM module 217 in the multimedia content summarization device 102 may determine the primary object of interest based on the identified primary objects. The LSTM module 217 may receive the object mapping table 205 of the primary object from the repository 106. The object mapping table 205 may comprise the primary object, interacting secondary object, action/interaction between the primary object and the secondary object, interacting tertiary object (if any), action/interaction between the secondary object and the tertiary object, start time, end time of the interaction, and the parameters such as frequency of appearance, duration of action etc. Table. 2 shows an exemplary object mapping table 205.

TABLE 2

| | 1° Obj | 2° Obj | 3° Obj | Interaction | Start time | End Time | Frequency | Duration |
|---|---|---|---|---|---|---|---|---|
| 1 | Dhoni | Bowler | | Batting | 12:30:00 | 12:50:00 | 6 | 1 mt |
| 2 | Dhoni | | | Sitting | 13:00:00 | 13:05:00 | 1 | 5 mts |

After receiving the object mapping table 205, the LSTM module 217 may generate the probabilities of the one or more primary objects being the at least one primary object of interest as the output. The primary object of interest may be determined from the primary objects by selectively prioritizing the parameters. In an embodiment, selectively prioritizing the parameters to determine the primary object of interest may include assigning by the object weightage calculation module 219, a weight to each of the parameters stored in the repository 106 and determining the primary object of interest from the primary objects based on the assigned weight. Referring back to Table. 2, the primary object of interest may be identified as "Dhoni". The frames that includes Dhoni "batting" may be given higher weightage by the LSTM module 217 as opposed to Dhoni "sitting", even though duration of Dhoni "sitting" is more.

The object weightage calculation module 219, selectively prioritizes the parameters stored in the repository 106 to determine the primary object of interest. A weight may be assigned based on adding a value allocated to each of the parameters associated with the primary objects and identifying the actions associated with the primary objects and the interactions between the primary objects and the secondary objects. Wherein the parameters may comprise frequency of appearance of the primary objects, duration of appearance of the primary objects, the number of interactions between the primary objects and the secondary objects, and frequency of reference of the primary objects in the multimedia content. The object weightage calculation module 219 may take into consideration output of the LSTM module 217 and a synonym dictionary in order to assign weight to the parameters. The one or more primary object with higher weightage is determined as the at least one primary object of interest. Referring back to Table. 1, a user may provide the user input as "Archie's friendship". In the same illustration, the synonym dictionary may help in identifying that the interactions "joking" and "playing" are more associated with "friendship" than "dancing" and "hugging". However, if the user input is "Archie's romance", the synonym dictionary may help in identifying that the interactions "dancing" and "hugging" have a stronger relationship with "romance" than "joking" and "playing".

In an embodiment, the primary objects assigned comparatively more weight is retained while the rest may be discarded or summarized concisely. The multimedia content summarization device 102, summarizes the multimedia content on the primary object of interest, the actions associated with the primary object of interest, interactions between the primary object of interest and the secondary objects, and interactions between the secondary objects and tertiary objects. The summarized multimedia content may be rendered on the user device 110. In one embodiment, the multimedia content summarization device 102 may retain the frames that include the primary object of interest (for instance "Dhoni") in the summarized multimedia content. Further, the multimedia content summarization device 102 may summarize those frames that include action (For instance, "batting") associated with the primary object of interest (For instance "Dhoni") in the summarized multimedia content.

TABLE 3

| | 1° Obj | 2° Obj | 3° Obj | Interaction | Start time | End Time | Frequency | Duration |
|---|---|---|---|---|---|---|---|---|
| 1 | Julia | Dog | | Sees dog dead | 14:00:00 | 14:02:00 | 1 | 3 sec |
| 2 | | Dog | Bob | Bob poisons dog | 13:00:00 | 13:05:00 | 4 | 3 mts |

The multimedia content summarization device 102 may also summarize the interactions between the primary object of interest and the secondary objects. For instance, in Table. 3 the frames that include "Julia's" (Primary object of interest) interaction (sees dog dead) with the Dog (secondary object) maybe summarized. A person skilled in the art may be able to appreciate that the term "interaction" may also include a "silent" scene as well. This is indicated by the illustration in Table. 3. Further, the multimedia content summarization device 102 may also summarize the frames that include the interactions between the secondary objects and the tertiary objects. The frames that include interactions between the "dog" (secondary object) and "Bob" may be summarized and included in the summarized multimedia content, even though these frames do not contain the primary object of interest (i.e. "Julia"). The 5 minutes clipping that shows Bob's interaction with the "Dog" may be important even though "Julia" does not appear in it. This is because one of the frames that shows "Julia" includes an interaction with the Dog (where she "sees the dead body" of the "Dog"). In order to maintain continuity, it is important to know that "Bob" (tertiary object) was "feeding poison" to the "Dog" (Secondary object) in a previous frame. Hence, the clipping that involves "Bob" and the "dog" may be given a weightage and may be summarized and rendered to the user for continuity.

Figure 3:
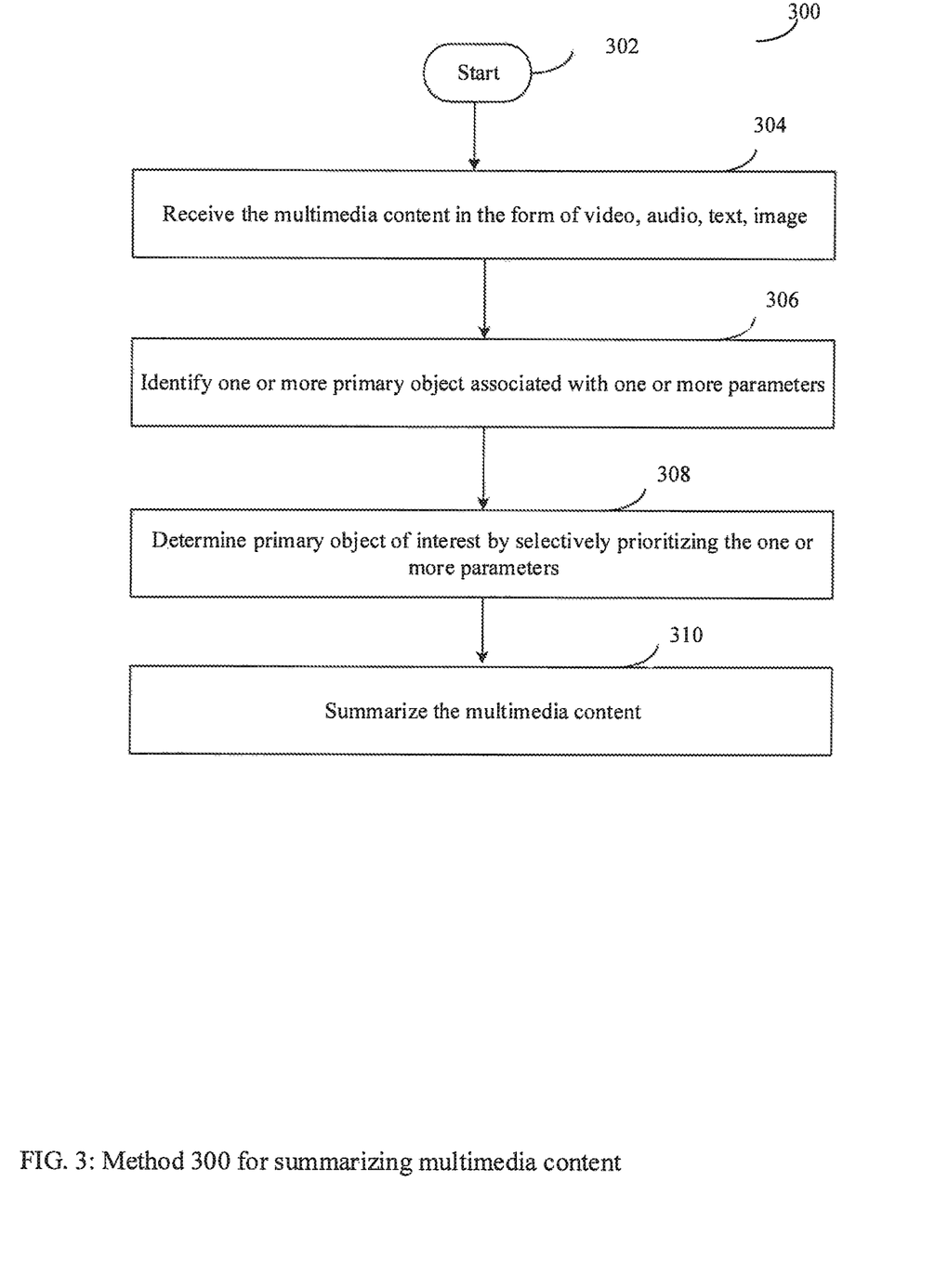
FIG. 3 illustrates an exemplary method for summarizing multimedia content, in accordance with some embodiments of the present disclosure.

FIG. 3 represents a flow diagram of a detailed exemplary process for summarizing multimedia content on a multimedia content summarization device 102, in accordance with some embodiments of the present disclosure. With reference to FIG. 3, there is shown a flow chart 300. The flow chart 300 is described in conjunction with FIGS. 1 and 2.

At step 304, the processor 116 in conjunction with the I/O interface 112 and the receiving module 213 may be configured to receive the multimedia content. The multimedia content may include video, audio, text or image.

At step 306, the multimedia content has been received, the processor 116 in conjunction with scene parsing module 215, parses the multimedia content, into various constituents. Further, the processor 116 in conjunction with the LSTM module 217 identifies the one or more primary objects. The identification of the primary objects at step 304 includes identifying one or more actions associated with the primary objects and one or more interactions between the primary objects and one or more secondary objects. The primary objects may be associated with the one or more parameters, stored in the repository 106. The parameters associated with the primary objects may include frequency of appearance of the primary objects, duration of appearance of the primary objects, duration of action associated with the primary objects, the number of interactions between the primary objects and the secondary objects, and frequency of reference of the primary objects in the multimedia content.

At step 308, the processor 116 in conjunction with an object weightage calculation module 219 may determine at least one primary object of interest from the primary objects by selectively prioritizing the parameters stored in the repository 106. Further, selectively prioritizing the parameters to determine the primary object of interest may comprise assigning by the object weightage calculation module 219 a weight to each of the parameters stored in the repository 106 and determining by the multimedia content summarization device 102, the primary object of interest from the primary objects based on the assigned weight. For instance, in a marriage video, the "brother" of the "bride", may be identified as the primary object of interest. This may be because, the parameter "number of interactions" was assigned a high weightage and the brother was seen to interact with all the guests in the video. In another illustration, a memorial ceremony for the Film actress "Brittany Murphy" may have frames of her movies and other actors sharing their memories about her. This video would involve the actors mentioning her name frequently. In this illustration, the "frequency of reference", may be assigned high weightage. Hence, the actress "Brittany Murphy" may be identified as the primary object of interest. In yet another illustration, a video surveillance camera may be used to track suspicious activity of a person. In this case, the duration of action should be given a weight, so that even a quick action is recorded as significant and should make the person associated with the quick action as the primary object of interest. In the same illustration, a frame may show the person taking a gun and putting it in his pocket. The duration of this action is small. Yet, very significant. The processor 116 in conjunction with the I/O interface 112 may determine the primary object of interest by a user input in form of a video, a text, an image, or an audio.

In the end, at step 310, the processor 116 in conjunction with the I/O interface 112 may summarize the multimedia content. The summarization of the multimedia content may be based on the primary object of interest, the actions associated with the primary object of interest, the interactions between the primary object of interest and the secondary objects, and the interactions between the secondary objects and the tertiary objects stored in the repository 106. The summarized multimedia content may further be rendered on the user device 110.

Figure 4:
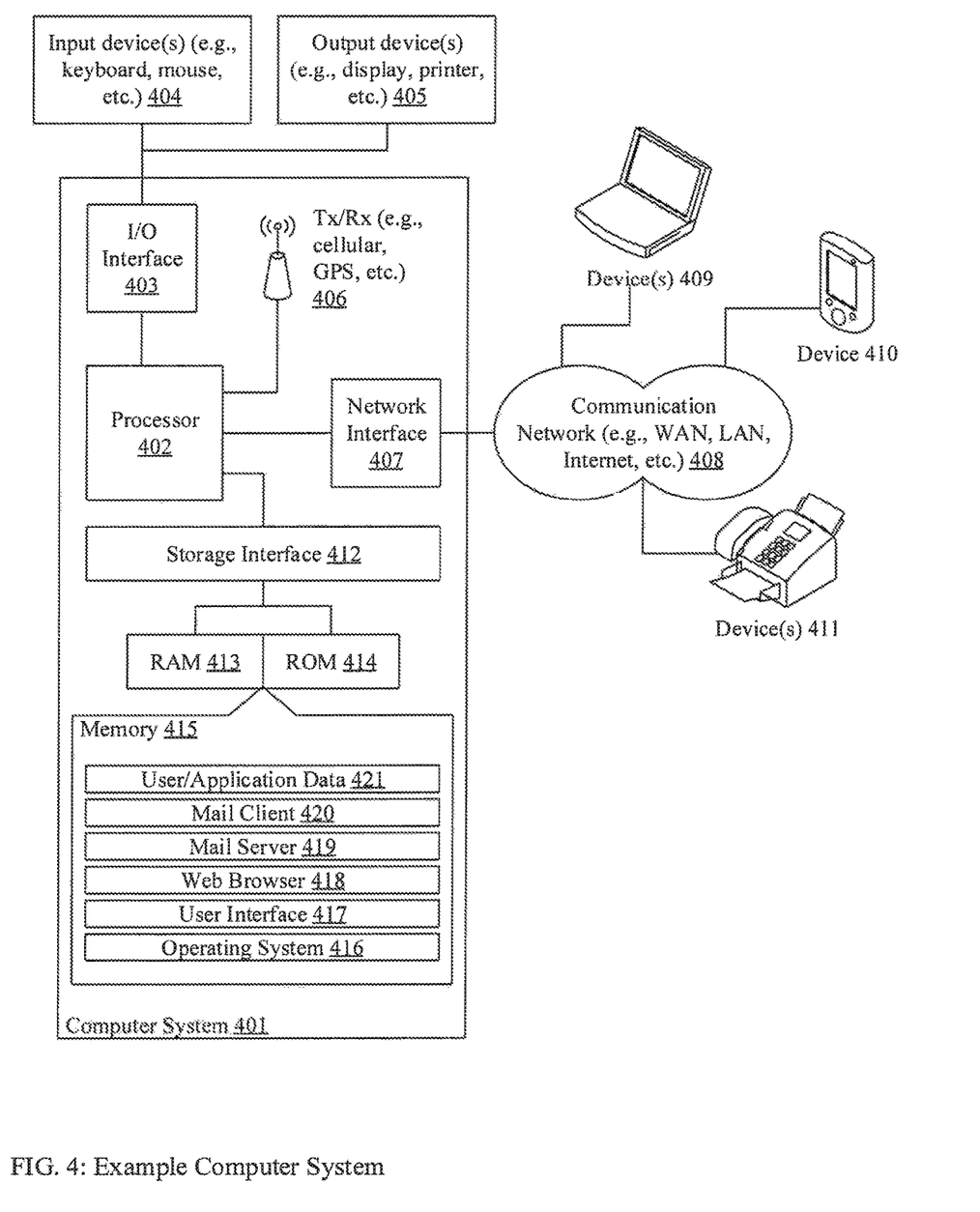
FIG. 4 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing network environment 100 for transmitting data over a communication network 408. Computer system 401 may include a central processing unit ("CPU" or "processor") 402. Processor 402 may include at least one data processor for executing program components for executing user- or system-generated requests. A user may include a person, a person using a device such as those included in this disclosure, or such a device itself. The processor 402 may include specialized processing units such as integrated system (bus) controllers, memory management control units, floating point units, graphics processing units, digital signal processing units, etc. The processor 402 may include a microprocessor, such as AMD ATHLON, DURON or OPTERON, ARM's application, embedded or secure processors, IBM POWERPC, INTEL'S CORE, ITANIUM, XEON, CELERON or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-VIDEO, VGA, IEEE 802.n/b/g/n/x, BLUETOOTH, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver 406 may facilitate various types of wireless transmission or reception. For example, the transceiver 406 may include an antenna operatively connected to a transceiver chip (e.g., TEXAS INSTRUMENTS WiLink WL1283, BROADCOM BCM4750IUB8, INFINEON TECHNOLOGIES X-GOLD 618-PMB9800, or the like), providing IEEE 802.11a/b/g/n, BLUETOOTH, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, ETHERNET (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices 409, 410, and 411 may include, without limitation, personal computer(s), server(s), fax machines, printers, scanners, various mobile devices such as cellular telephones, smartphones (e.g., APPLE IPHONE, BLACKBERRY, ANDROID-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 401 may itself embody one or more of these devices 409, 410, and 411.

In some embodiments, the processor 402 may be disposed in communication with one or more memory devices 415 (e.g., RAM 413, ROM 414, etc.) via a storage interface 412. The storage interface 412 may connect to memory devices 415 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 415 may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems 416 include, without limitation, APPLE MACINTOSH OS X, UNIX, UNIX-like system distributions (e.g., BERKELEY SOFTWARE DISTRIBUTION (BSD), FREEBSD, NETBSD, OPENBSD, etc.), LINUX DISTRIBUTIONS (e.g., RED HAT, UBUNTU, KUBUNTU, etc.), IBM OS/2, MICROSOFT WINDOWS (XP), VISTA/7/8, 10 etc.), APPLE IOS, GOOGLE™ ANDROID™, BLACKBERRY OS, or the like. User interface 417 may facilitate display, execution, interaction, manipulation, or operation of program components through textual or graphical facilities. For example, user interfaces 417 may provide computer interaction interface elements on a display system operatively connected to the computer system 401, such as cursors, icons, check boxes, menus, scrollers, windows, widgets, etc. Graphical user interfaces (GUIs) may be employed, including, without limitation, APPLE MACINTOSH OPERATING SYSTEMS' AQUA, IBM OS/2, MICROSOFT WINDOWS (E.G., AERO, METRO, ETC.), WEB INTERFACE LIBRARIES (E.G., ACTIVEX, JAVA, JAVASCRIPT, AJAX, HTML, ADOBE FLASH, ETC.), OR THE LIKE.

In some embodiments, the computer system 401 may implement a web browser 418 stored program component. The web browser 418 may be a hypertext viewing application, such as MICROSOFT INTERNET EXPLORER, GOOGLE CHROME, MOZILLA FIREFOX, APPLE SAFARI, etc. Secure web browsing may be provided using HTTPS (secure hypertext transport protocol), secure sockets layer (SSL), Transport Layer Security (TLS), etc. Web browsers 418 may utilize facilities such as AJAX, DHTML, ADOBE FLASH, JAVASCRIPT, JAVA, application programming interfaces (APIs), etc. In some embodiments, the computer system 401 may implement a mail server 419 stored program component. The mail server 419 may be an Internet mail server such as Microsoft Exchange, or the like. The mail server 419 may utilize facilities such as ASP, ACTIVEX, ANSI C++/C #, MICROSOFT, .NET, CGI SCRIPTS, JAVA, JAVASCRIPT, PERL, PHP, PYTHON, WEBOBJECTS, etc. The mail server 419 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client 420 may be a mail viewing application, such as APPLE MAIL, MICROSOFT ENTOURAGE, MICROSOFT OUTLOOK, MOZILLA THUNDERBIRD, and the like.

In some embodiments, computer system 401 may store user/application data 421, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as ORACLE or SYBASE. Alternatively, such databases may be implemented using standardized data structures, such as an array, hash, linked list, struct, structured text file (e.g., XML), table, or as object-oriented databases (e.g., using OBJECTSTORE, POET, ZOPE, etc.). Such databases may be consolidated or distributed, sometimes among the various computer systems 401 discussed above in this disclosure. It is to be understood that the structure and operation of the any computer or database component may be combined, consolidated, or distributed in any working combination.

As will be appreciated by those skilled in the art, the techniques described in the various embodiments discussed above provide for summarizing multimedia content on a multimedia content summarization device 102, thereby summarizing the content of user interest or comprising content of the primary object of interest. Such an operation enables user interest based summarization of the multimedia content, as the primary object of interest is retained with highest details and rest of the portion of the multimedia content gets highly summarized or discarded. Additionally, the techniques described in the various embodiments discussed above maintains the context continuity of the multimedia content as a predefined portion of the multimedia content appearing before and after the multimedia content associated with the at least one primary object of interest, is retained in the summarized multimedia content. Further, the text, audio and other elements in the multimedia may also be considered in summarizing the multimedia content. Additionally, the multimedia content summarization device 102 is capable of selectively prioritizing the parameters to determine the primary object of interest.

The specification has described method and system for summarizing multimedia content on a multimedia content summarization device 102. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of summarizing multimedia content, the method comprising:
   receiving, by a multimedia content summarization device, multimedia content;
   identifying, by the multimedia content summarization device, one or more primary objects from the multimedia content, wherein the one or more primary objects are associated with one or more parameters, wherein identifying the one or more primary objects comprises identifying one or more actions associated with the one or more primary objects and one or more interactions between the one or more primary objects and one or more secondary objects;
   determining, by the multimedia content summarization device, at least one primary object of interest from the one or more primary objects by selectively prioritizing the one or more parameters, wherein the one or more parameters are selectively prioritized by assigning a weight to each of the one or more parameters in a repository, and wherein the one or more actions associated with the one or more primary objects is assigned a higher weightage based on duration of appearance of the one or more primary objects; and
   summarizing, by the multimedia content summarization device, the multimedia content based on the at least one primary object of interest, one or more actions associated with the at least one primary object of interest, one or more interactions between the at least one primary object of interest and the one or more secondary objects, and one or more interactions between the one or more secondary objects and one or more tertiary objects.

2. The method as claimed in claim 1, wherein the one or more parameters associated with the one or more primary objects comprises frequency of appearance of the one or more primary objects, the duration of appearance of the one or more primary objects, the number of interactions between the one or more primary objects and the one or more secondary objects, and frequency of reference of the one or more primary objects in the multimedia content.

3. The method as claimed in claim 1, further comprising creating the repository, wherein the repository comprises at least one of the one or more primary objects, the one or more secondary objects, the one or more actions associated with the one or more primary objects, the interactions between the one or more primary objects and the one or more secondary objects, or the one or more parameters.

4. The method claimed in claim 1, wherein summarizing the multimedia content comprises:
   retaining, by the multimedia content summarization device, a predefined portion of the multimedia content appearing before and after the multimedia content associated with the at least one primary object of interest.

5. The method as claimed in claim 1, further comprising receiving the primary object of interest as a user input.

6. The method of claim 1, wherein identifying the one or more primary objects from the multimedia content comprises parsing a plurality of frames associated with the multimedia content.

7. A system for summarizing multimedia content, the system comprising:
   a processor; and
   a memory communicatively coupled to the processor, wherein the memory stores processor executable instructions, which on execution causes the processor to:
   receive multimedia content;
   identify one or more primary objects from the multimedia content, wherein the one or more primary objects are associated with one or more parameters, wherein identifying the one or more primary objects comprises identifying one or more actions associated with the one or more primary objects and one or more interactions between the one or more primary objects and one or more secondary objects;
   determine at least one primary object of interest from the one or more primary objects by selectively prioritizing the one or more parameters, wherein the one or more parameters are selectively prioritized by assigning a weight to each of the one or more parameters in a repository, and wherein the one or more actions associated with the one or more primary objects is assigned a higher weightage based on duration of appearance of the one or more primary objects; and
   summarize the multimedia content based on the at least one primary object of interest, one or more actions associated with the at least one primary object of interest, one or more interactions between the at least one primary object of interest and the one or more secondary objects, and one or more interactions between the one or more secondary objects and one or more tertiary objects.

8. The system as claimed in claim 7, wherein the one or more parameters associated with the one or more primary objects comprises frequency of appearance of the one or more primary objects, the duration of appearance of the one or more primary objects, the number of interactions between the one or more primary objects and the one or more secondary objects, and frequency of reference of the one or more primary objects in the multimedia content.

9. The system as claimed in claim 7, the processor is further configured to create the repository, wherein the repository comprises at least one of the one or more primary objects, the one or more secondary objects, the one or more actions associated with the one or more primary objects, the interactions between the one or more primary objects and the one or more secondary objects, or the one or more parameters.

10. The system claimed in claim 7, wherein to summarize the multimedia content, the processor is configured to retain a predefined portion of the multimedia content appearing before and after the multimedia content associated with the at least one primary object of interest.

11. The system as claimed in claim 7, the processor is further configured to receive the primary object of interest as a user input.

12. The system of claim 7, wherein to identify the one or more primary objects from the multimedia content, the processor is configured to parse a plurality of frames associated with the multimedia content.

13. A non-transitory computer-readable medium for summarizing multimedia content, wherein upon execution of the instructions by one or more processors, the one or more processors perform one or more operations comprising:
receiving multimedia content;
identifying one or more primary objects from the multimedia content, wherein the one or more primary objects are associated with one or more parameters, wherein identifying the one or more primary objects comprises identifying one or more actions associated with the one or more primary objects and one or more interactions between the one or more primary objects and one or more secondary objects;
determining at least one primary object of interest from the one or more primary objects by selectively prioritizing the one or more parameters, wherein the one or more parameters are selectively prioritized by assigning a weight to each of the one or more parameters in a repository, and wherein the one or more actions associated with the one or more primary objects is assigned a higher weightage based on duration of appearance of the one or more primary objects; and
summarizing the multimedia content based on the at least one primary object of interest, one or more actions associated with the at least one primary object of interest, one or more interactions between the at least one primary object of interest and the one or more secondary objects, and one or more interactions between the one or more secondary objects and one or more tertiary objects.

* * * * *